(12) United States Patent
Deniau (10) Patent No.: US 8,206,570 B2
(45) Date of Patent: Jun. 26, 2012

(54) PROCESS FOR FORMING ORGANIC FILMS ON ELECTRICALLY CONDUCTIVE OR SEMI-CONDUCTIVE SURFACES USING AQUEOUS SOLUTIONS IN TWO STEPS

(75) Inventor: Guy Deniau, Auffargis (FR)

(73) Assignee: Commissariat a l'Energie Atomique, Etablissement Public a Caractere Industriel et Commercial, Paris (FR)

( * ) Notice: Subject to any disclaimer, the term of this patent is extended or adjusted under 35 U.S.C. 154(b) by 1188 days.

(21) Appl. No.: 11/683,390

(22) Filed: Mar. 7, 2007

(65) Prior Publication Data

US 2008/0087550 A1 Apr. 17, 2008

(30) Foreign Application Priority Data

Oct. 12, 2006 (FR) ...................... 06 08945

(51) Int. Cl.
*C23C 28/00* (2006.01)
*C25D 9/02* (2006.01)
(52) U.S. Cl. .................... 205/198; 205/316; 205/317
(58) Field of Classification Search .................. 205/198
See application file for complete search history.

(56) References Cited

U.S. PATENT DOCUMENTS

| | | | | |
|---|---|---|---|---|
| 4,000,028 A * | 12/1976 | Hoey | ............................. | 156/79 |
| 4,130,426 A * | 12/1978 | Takeda et al. | ................. | 430/151 |
| 4,724,053 A * | 2/1988 | Jasne | ........................... | 106/236 |
| 5,997,585 A * | 12/1999 | Scialla et al. | ..................... | 8/137 |
| 6,472,486 B2 * | 10/2002 | Klaerner et al. | ............. | 526/220 |
| 2003/0162039 A1 * | 8/2003 | Pinson et al. | ................. | 428/457 |
| 2004/0248428 A1 * | 12/2004 | Bureau et al. | ................. | 438/780 |
| 2005/0272876 A1 * | 12/2005 | Seko et al. | ..................... | 525/242 |
| 2006/0141156 A1 * | 6/2006 | Viel et al. | ...................... | 427/258 |
| 2008/0087550 A1 | 4/2008 | Deniau | | |

FOREIGN PATENT DOCUMENTS

| | | | |
|---|---|---|---|
| FR | 2804973 | A1 | 8/2001 |
| FR | 2829046 | A1 | 3/2003 |
| FR | 2907131 | A1 | 4/2008 |
| WO | WO 2004074537 | A1 * | 9/2004 |

OTHER PUBLICATIONS

"Surface Initiated Emulsion Polymerization: Grafted Organic Coatings from Aqueous Solutions" by Deniau et al., Chem. Mater. 18, pp. 5421-5428 (2006).*
"Electroinitiated Emulsion Polymerization of Vinyl Acetate" by Tidswell et al., Br. Polym. J. vol. 7, pp. 409-416 (1975).*

(Continued)

*Primary Examiner* — Harry D Wilkins, III
*Assistant Examiner* — Bryan D. Ripa
(74) *Attorney, Agent, or Firm* — Young & Thompson (57) ABSTRACT

The present invention concerns a method for preparing an organic copolymer film on electrically conductive or semi-conductive surfaces in two steps. The first step includes electrolysis of an electrolytic solution containing an adhesion primer, in contact with a surface. The second step corresponds to the reaction, at the surface obtained previously, of a solution containing the following species: a protic solvent, and a "radically polymerizable" monomer. The polymerizable monomer is solubilized in micellar form. The surfaces obtained with the use of this method, and their applications apply to preparation of microelectronic components, biomedical devices or screening kits, as well as kits for preparing an organic copolymer film on an electrically conductive or semi-conductive surface.

31 Claims, 6 Drawing Sheets

OTHER PUBLICATIONS

"Spontaneous Grafting of Iron Surfaces by Reduction of Aryldiazonium Salts in Acidic or Neutral Aqueous Solutions. Application to the Protection of Iron Against Corrosion" by Combellas et al., Chem. Mater. 17, pp. 3968-3975 (2005).*

"Polymer Brushes via Surface-Initiated Polymerization" by Edmondson et al., Chem. Soc. Rev. 33, pp. 14-22 (2004).*

Reza Ansari, "Polypyrrole Conducting Electroactive Polymers: Synthesis and Stability Studies", E-Journal of Chemistry, vol. 3, No. 13, pp. 186-201, Oct. 2006.

Xu Zhang et al., "Studies of Arenediazonium Salts as a New Class of Electropolymerization Initiator", U-136, Polymer Program, University of Connecticut, Storrs, Connecticut 06269, pp. 2265-2272, (1999).

Hynek Biederman et al., "Plasma Polymerization Processes", chapter 1, Introduction, pp. 1-7, (1992).

Christophe Bureau et al., "Synthesis and Structure of Polymer/Metal Interfaces: a Convergence of Views between Theory and Experiment", Journal of Surface Analysis, vol. 6, No. 2 (1999), pp. 159-170.

Christophe Bureau, "Polymerization reaction coupled to charge transfer: propagation versus termination as a source of permanent travelling waves and multi-peak voltammograms", Journal of Electroanalytical Chemistry 479 (1999) 43-56.

Christophe Bureau et al., Comments on "The Electroreduction of Acrylonitrile: A New Insight into the Mechanism" by Mertens et al., Macromolecules, 1997,30, pp. 333-336.

Julienne Charlier et al., "Main Strategies to Direct Localized Organic Grafting on Conducting and Semiconducting Substrates", New Nanotechniques, pp. 1-32, 2009 Nova Science Publishers, Inc.

Guy Deniau et al., "Coupled chemistry revisited in the tentative cathodic electropolymerization of 2-butenenitrile", Journal of Electroanalytical Chemistry 451 (1998) pp. 145-161.

Guy Deniau et al., "Carbon-to-metal bonds: Electrochemical reduction of 2-butenenitrile", Surface Science 600 (2006) pp. 675-684.

Mitsuharu Konuma, "Film Deposition by Plasma Techniques", Springer Series on Atoms and Plasmas, pp. 173-177, (1992).

S. Palacin, "Molecule-to-Metal Bonds: Electrografting Polymers on Conducting Surfaces", A European Journal of Chemical Physics and Physical Chemistry, pp. 1468-1481, 2004 Wiley-VCH Verlag GmbH& Co. KGaA, Weinheim.

Jean Roncali, "Conjugated Poly(thiophenes): Synthesis, Functionalization, and Applications", Chem. Rev. 1992, 92, pp. 711-738.

Abraham Ulman, "Self-Assembled Monolayers", An Introduction to Ultrathin Organic Films from Langmuir-Blodgett to Self-Assembly, pp. 237-239, (1991).

* cited by examiner

PROCESS FOR FORMING ORGANIC FILMS ON ELECTRICALLY CONDUCTIVE OR SEMI-CONDUCTIVE SURFACES USING AQUEOUS SOLUTIONS IN TWO STEPS

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention concerns the area of surface coatings, the said coatings being in the form of organic films. It relates specifically to a method for forming copolymer organic films by electrochemical grafting on electrically conductive or semi-conductive surfaces using aqueous solutions of precursors that are appropriately selected in order to permit the formation of these organic films in a simple and reproducible manner, to the surfaces obtained by using this method, and to their applications, in particular for preparation of microelectronic components, biomedical devices or screening kits, and to kits for implementing said method.

2. Description of Related Art Including Information Disclosed Under 37 CFR 1.97 and 37 CFR 1.98

At the present time, several techniques are available to form thin organic films on substrates, each based on a family or class of adapted molecules.

The coating method using centrifugation known as "spin coating" or the relative methods of immersion (dip coating) or vaporization (spray coating) do not require any specific affinity between the deposited molecules and the substrate of interest. In fact, the cohesion of the deposited film is essentially based on the interaction between the constituents of the film, which may be, e.g., cross-linked after being deposited to improve stability. These techniques are very versatile, applicable to all types of surfaces to be covered, and are very reproducible. However, they do not permit any effective grafting between the film and the substrate (it is a case of simple physisorption), and the thicknesses produced are difficult to control, especially for the thinnest deposits (less than 20 nanometers). In addition, the spin coating techniques do not allow uniform deposits unless the surface to be covered is essentially flat. The quality of the films obtained by "spray coating" is dependent on the wetting of the surfaces by the spray, since the deposit does not essentially become film-like until the drops coalesce. Thus, for a given polymer, generally only one or two organic solvents exist that are capable of yielding satisfying results in terms of controlling the thickness and the homogeneity of the deposit.

Other techniques for forming an organic coating on the surface of a support, such as plasma deposition, which is described in the articles by M. Konuma, "Film deposition by plasma techniques," (1992) Springer Verlag, Berlin; H. Biederman and Y. Osada, "Plasma polymerization processes," 1992, Elsevier, Amsterdam, or photochemical activation are based on a similar principle: producing unstable derivatives of a given precursor close to the surface to be covered which evolve by forming a film on the substrate. While plasma deposition does not require any specific properties of these precursors, photo-activation requires the use of photosensitive precursors, the structure of which evolves under the influence of light. These techniques generally give rise to the formation of adherent films, even though it is usually impossible to discern whether this adhesion is due to cross-linking of a topologically closed film around the object or a real formation of interface bonds.

Self-assembly of organic monolayers is a very simple technique to use (A. Ulman, "An introduction to ultrathin organic films from Langmuir-Blodgett films to self-assembly," 1991, Boston, Academic Press). Still, this technique requires the use of molecular precursors having an adequate affinity for the surface of interest to be coated. Then precursor-surface pairs can be spoken of, such as the sulfur compounds that have an affinity for gold or silver, the tri-halogen silanes for oxides like silica or aluminium, the polyaromatics for graphite or carbon nanotubes. In all cases, the film formation is based on a specific chemical reaction between a part of the molecular precursor (the sulfur atom in the case of thiols, for example) and some "receptor" sites on the surface. A chemisorption reaction ensures bonding. Thus, at ambient temperature and in solution, films with molecular thickness (less than 10 nm) are obtained. However, while the pairs involving oxide surfaces give rise to the formation of films that are very tightly grafted (the Si—O bond involved in the chemisorption of the tri-halogen silanes on silica is among the most stable in chemistry), this is of no use when there is an interest in metals or semi-conductors without oxide. In this case, the interfacial bond between the conductive surface and the monomolecular film is fragile. Thus, self-assembled monolayers of thiols on gold desorb when heated above 60° C. or in the presence of a good solvent at ambient temperature, or even when they come in contact with an oxidizing or reducing liquid medium. In a similar manner, the Si—O—Si bonds are weakened when they are in an aqueous medium, i.e., humidity, especially with the effect of heat.

The electrografting of polymers is a technique based upon the initiation and the polymerization by propagation of an electrically induced chain of electroactive monomers on the surface of interest, playing simultaneously the role of electrode and that of a polymerization primer (S. Palacin et al., "Molecule-to-metal bonds: electrografting polymers on conducting surfaces," Chem Phys Chem, 2004, 10, 1468). Electrografting requires the use of precursors that are adapted to its mechanism of initiation by reduction and of propagation, generally anionic, since cathodic electrografting, which is applicable on noble metals and non-noble metals, is often preferred to anodic electrografting (which is only applicable to noble metals). "Depleted vinyl" molecules, i.e., vinylic moieties bearing electro-attractor functional groups like the acrylonitriles, the acrylates, the vinyl pyridines, etc., are particularly adapted to this method, which gives rise to a number of applications in the area of microelectronics and in the biomedical area. The adherence of the electrografted films is ensured by a carbon-metal type covalent bond (G. Deniau et al., "Carbon-to-metal bonds: electrochemical reduction of 2 butenenitrile," Surface Science, 2006, 600, 675-684).

According to this electrografting technique, polymerization is essential for the formation of the carbon/metal interface bond: it has actually been shown (G. Deniau et al., "Coupled chemistry revisited in the tentative cathodic electropolymerization of 2-butenenitrile," Journal of Electroanalytical Chemistry, 1998, 451, 145-161) that the electrografting mechanism proceeds via an electroreduction of the monomers on the surface to yield an unstable radical anion, which, if not close to other polymerizable molecules, desorbs back to the solution (op. cit.). Besides the desorption reaction, the addition reaction (of the Michael addition type) of the first chemisorbed radical anion on a free monomer, offers a stabilizing route for the transient species: indeed the product of this addition yields a new radical anion which charge is now "at a distance from" the surface, which contributes to stabilizing the adsorbed structure. That dimeric radical anion itself may again be added to another free monomer etc.: each new addition gives additional stability by relaxation of the charge/polarized surface repulsion, which means that the interface bond of the first, temporarily, radical anion becomes more and more stable as the polymerization extents. In other words, it has been asserted that a vinylic monomer that cannot be polymerized cannot be electro-grafted.

Among the different techniques mentioned above, electrografting is the only technique that makes it possible to produce grafted films with a specific control of the interface bond. In addition, in contrast to the plasma or photo-induced techniques, electrografting does not generate reactive species except in the immediate vicinity of the surface of interest (in the double electrochemical layer, the thickness of which is of several nanometers in the majority of cases).

It seems now admitted that obtaining grafted polymer films by electrografting of activated vinyl monomers on electrically conductive surfaces proceeds via an electro-initiation of the polymerization reaction starting from the surface, followed by a growth in the chains, monomer by monomer. The reaction mechanism of electrografting has been described, in particular, in the articles of C. Bureau et al., Macromolecules, 1997, 30, 333; C. Bureau and J. Delhalle, Journal of Surface Analysis, 1999, 6(2), 159 and C. Bureau et al., Journal of Adhesion, 1996, 58, 101.

By way of example, the electrografting mechanism of acrylonitrile by cathodic polarization can be represented by Diagram A following:

DIAGRAM A

Key:
1. Chemical surface reaction, grafting
2. Desorption, polymerization in solution In this diagram, the grafting reaction corresponds to step 1, where the growth takes place starting from the surface. Step 2 is the principal parasitic reaction, which leads to a non-grafted polymer. This reaction is limited by the use of high monomer concentrations.

The growth of the grafted chains is thus carried out by purely chemical polymerization, i.e., independently of the polarization of the conductive surface that has given rise to the grafting. This step is thus sensitive to (and is in particular interrupted by) the presence of chemical inhibitors of the growth, in particular by protons.

In Diagram A above, where electrografting of acrylonitrile using cathodic polarization is considered, the growth of the grafted chains is carried out by anionic polymerization. This growth is interrupted, in particular, by protons and it has also been demonstrated that the amount of protons is the major parameter that control the formation of polymers in solution. Information obtained in the course of synthesis, especially the shape of voltamograms that accompany the synthesis, (see in particular the article by C. Bureau, Journal of Electroanalytical Chemistry, 1999, 479, 43) show clearly that traces of water, and more generally labile protons of protonic solvents, are sources of protons that are detrimental to the growth of the grafted chains.

On the whole, if ways to produce chemical bonds on electrically conductive or semi-conductive substrates by electrografting of different precursors using organic solutions are known, it remains difficult to obtain electrografted films from aqueous solutions, since the corresponding mechanism (anionic-type polymerization) prohibits working in water. Up to the present time, only aryl diazonium salts have made it possible to approach a solution to this problem.

Indeed, as described, e.g., in the French patent application FR-A-2 804 973, electrografting of precursors such as aryl diazonium salts, that carry a positive charge, can be carried out due to a cleavage reaction after reduction of the cation, to yield a radical that chemisorbs on the surface. Just as in electrografting of polymers, the electrografting reaction of aryl diazonium salts is electro-initiated and leads to the formation of interface chemical bonds. In contrast, to the electrografting reactions of vinylic polymers, the electrografting of aryl diazonium salts does not require a coupled chemical reaction to stabilize the chemisorbed species formed by charge transfer since this species is electrically neutral and not charged negatively as in the case of a vinylic monomer. It thus leads—a priori—to a stable surface/aryl group adduct.

However, it has been shown, especially in the French patent application FR-A-2 829 046, that aryl diazonium salts lead to thin organic films that can grow on themselves: once the grafting on the initial surface has been carried out by electrocleaving and chemisorption reaction, the film grows by polarisation-induced reaction as conducting polymers but at the cathode. This results in difficulties in controlling the organic film thicknesses resulting from electrografting of aryl diazonium salts. On the other hand, the combination in aqueous solution of a diazonium salt and a vinylic monomer can lead to the formation of a grafted film under the condition that the vinylic monomer is soluble in water. However, this method of obtaining grafted films is limited to the rare vinylic monomers that are soluble in water like some acrylic acids, some hydroxylated or aminated vinylic monomers and generally leads to poor quality films (see article by Bell and Zhang, Journal of Applied Polymer Science, 1999, 73, 2265-272).

The electro-grafting reactions that are currently available according to the prior art thus make it possible to easily obtain a certain variety of organic films on different conductive and semi-conductive substrates using organic solutions. Nevertheless, it will be necessary to extend this range in order to respond to the demand of industry, to diversify the usage properties of such materials and thus their application possibilities. In addition, the protocols used in industry make use of organic solvents that are notoriously toxic and costly. Thus, it is also desirable to propose new process that are less polluting and more profitable for industries.

BRIEF SUMMARY OF THE INVENTION

At the current time, no process exists that makes it possible to produce grafted organic films of good quality on electrically conductive or semi-conductive surfaces that can be implemented easily in a protic environment, in particular in aqueous media, using a large variety of polymerizable monomers.

The inventor has provided the beginning of a response to this type of problem in the French patent application number 06 01804 filed on 28 Feb. 2006. This invention corresponds to an improvement on the previous technological advance.

The inventor has discovered, in a surprising and unexpected manner, that it is possible to produce a copolymer organic film on an electrically conductive or semi-conductive surface in a protic medium, and especially an aqueous medium, using a large variety of monomers and in particular vinyl monomers, preferably hydrophobic ones, in two distinct steps.

The inventor has actually implemented a preparation process for a copolymer organic film on an electrically conductive or semi-conductive surface in two steps. The first step consists of electrolysis of an electrolytic solution, including an adhesion primer, in contact with said surface, and the second step corresponds to the reaction, at the surface obtained previously, of a solution containing the following species: a protic solvent and a monomer that can polymerize following a free-radical mechanism, the said process being characterized in that the polymerizable monomer is solubilized in micellar form.

Thus the invention has as its first object a process for formation of a copolymer organic film on an electrically conductive or semi-conductive surface in two steps:
  a) electrolysis of an electrolytic solution containing an adhesion primer until a primer coating is formed on the surface, said electrolysis being performed at a reduction potential at least equal to the reduction potential of the adhesion primer,
  b) reaction of a solution comprising:
    at least one protic solvent,
    at least one radically polymerizable monomer,
    at least one surfactant,
  on the surface obtained at the end of step (a) in the presence of a free-radical polymerization initiator.

In the sense of the present invention, "copolymer" organic film means any polymer film derived from several monomer units of different chemical species and, in particular, any film prepared using at least one type of monomer that is polymerizable, in particular following a free-radical mechanism, and at least one type of adhesion primer, also polymerizable.

In the sense of the present invention, "adhesion primer" is understood as any organic molecule that is able to chemisorb on an electrically conductive or semi-conductive surface by electrochemical reaction (electrochemical grafting) and bears a function reactive with respect to a carbon radical after chemisorption. The reaction at issue here is an electrografting reaction that leads to the formation of covalent bonds between the surface and the grafted primer in order to form a primer coating. Thus, for example, the primer can be chosen among the conjugated systems, the halogenated alkanes and the aryl diazonium salts.

In a non-limiting manner, the electrically conductive or semi-conductive surfaces are chosen among stainless steel, steel, iron, copper, nickel, cobalt, niobium, aluminium, silver, titanium, silicon with or without its oxide, titanium nitride, tungsten, tungsten nitride, tantalum, tantalum nitride and noble metal surfaces made up of at least one metal chosen among gold, platinum, iridium and irradiated platinum. According to a preferred embodiment of the invention, the surface used is a surface of steel, in particular stainless steel, for example, stainless steel of the type 316, preferably 316 L.

The electrolytic solution comprises a solvent and can contain different electrolytes. The solvent of the electrolytic solution is preferably chosen among dimethylformamide, ethyl acetate, acetonitrile, dimethyl sulfoxide, tetrahydrofuran, the protic solvents, or a mixture of two or more of these solvents.

The protic solvent is advantageously chosen among water, acetic acid, hydroxylated solvents like methanol and ethanol, liquid glycols with low molecular weight such as ethylene glycol, and mixtures of them. According to a specific embodiment of the invention, the protic solvent may be used in a mixture with an aprotic solvent, it being understood that the resulting mixture presents the characteristics of a protic solvent. Water is the preferred protic solvent, it is particularly interesting that the water be distilled or deionized.

It is preferable for the adhesion primer to be soluble in the solvent used, said solvent being in particular a protic solvent. In the sense of the invention, a primer is considered soluble in a given solvent if it remains soluble up to a concentration of 0.5 M, i.e. its solubility is at least equal to 0.5 M under normal temperature and pressure conditions. Solubility is defined as the analytical composition of a saturated solution, expressed in terms of the proportion of a designated solute in a designated solvent; it can particularly be expressed in molarity. A solution containing a given concentration of compound will be considered saturated when the concentration is equal to the solubility of the compound in this solvent. Thus, the solubility may be finite just as it may be infinite; in the latter case the compound is soluble in any proportion in the solvent considered.

The preferred adhesion primers according to the invention are chosen from the conjugated systems, the halogen alkanes and the aryl diazonium salts, which are preferred.

Among the aryl diazonium salts, the compounds of the following formula (I) can especially be mentioned:

$$R\text{—}N_2^+, A^- \qquad (I)$$

in which:
  A represents a monovalent anion; and
  R represents an aryl group.

As aryl group of the compounds of formula (I) above, it is especially possible to mention the aromatic or heteroaromatic carbonated structures, possibly monosubstituted or polysubstituted, made up of one or several aromatic or heteroaromatic cycles each comprising three to eight atoms, it being possible for the heteroatom to be N, O, P or S. The substituent or substituents can contain one or several heteroatoms such as N, O, F, Cl, P, Si, Br or S as well as alkyl groups.

Among the compounds of formula (I) above, A can particularly be chosen among the inorganic anions such as the halides like $I^-$, $Br^-$ and $Cl^-$, the halogeno borates such as tetrafluoroborate, and the organic anions such as alcoholates, carboxylates, perchlorates and sulfates.

Among the compounds of formula (I) above, R is preferably chosen among the aryl groups substituted by the electron withdrawing groups such as $NO_2$, ketones, aldehydes, CN, $CO_2H$, the esters and the halogens. The groups R of the aryl type that are especially preferred are the nitrophenyl and phenyl radicals.

By way of compounds of formula (I), it is particularly advantageous to use phenyl diazonium tetrafluoroborate, 4 nitrophenyl diazonium tetrafluoroborate, 4-bromophenyl diazonium tetrafluoroborate, 2-methyl-4-chlorophenyl diazonium chloride, 4 benzoyl benzene diazonium tetrafluoroborate, 4-cyanophenyl diazonium tetrafluoroborate, 4-carboxyphenyl diazonium tetrafluoroborate, 4 acetamidophenyl diazonium tetrafluoroborate, 4-phenyl acetic acid diazonium tetrafluoroborate, 2-methyl-4-[(2-methylphenyl)diazenyl] benzene diazonium sulfate, 9,10-dioxo-9,10-dihydro-1-anthracene diazonium chloride, 4 nitronaphthalene diazonium tetrafluoroborate and naphthalene diazonium tetrafluoroborate.

The quantity of adhesion primer present in the electrolytic solution used according to the process of the invention may vary as a function of the experimenter's wishes. This quantity is particularly connected to the thickness of the copolymer organic film desired as well as the quantity of adhesion primer that is desirable to be integrated in the film. Thus, in order to obtain a grafted film on the entire surface used, it is necessary to use a minimum quantity of adhesion primer that can be estimated by space-filling calculations. According to one specific advantageous embodiment of the invention, the primer adhesion concentration in the electrolytic solution is between around $10^{-4}$ and 0.5 M. The primer coating is formed when the surface is covered by at least one grafted monomer film. It is of course possible to use any analytic means to check for the presence of the primer coating and determine the thickness thereof. Such means can in particular be infrared spectrometry or X and UV photoelectron spectroscopy measurements.

Advantageously, if the adhesion primer is an aryl diazonium salt, the pH of the electrolytic solution is less than 7, typically less than or equal to 2. It is recommended to work at a pH between 1.6 and 2.2. If necessary, the pH of the electrolytic solution can be adjusted to the desired value by means of one or more acidifying agents well known to a person skilled in the art, for example by means of mineral or organic acids such as hydrochloric acid, sulfuric acid, and so on.

The electrolysis of the electrolytic solution is preferably performed under agitation, for example by mechanical stirring and typically with a magnetic bar, or in some cases by bubbling.

It is also preferable for the process to include an additional step, prior to the electrolysis step, of cleaning the surface on which the copolymer organic film is expected to be formed, in particular by sanding and/or polishing; an additional treatment under ultrasound with an organic solvent such as ethanol, acetone or dimethylformamide (DMF) is even recommended. It is also advantageous for the solvent used to be degassed before the implementation of the process or purged by means of an inert gas such as argon or nitrogen.

The potential applied to the electrolytic solution must correspond at least to the reduction potential of the adhesion primer in order to enable the electrolysis, which corresponds to the initiation of the formation of the primer coating.

Typically, it is not necessary for the electrolytic solution to contain a large proportion of adhesion primer; indeed, in theory, the sufficient amount corresponds to what is necessary for the formation of an organic film, a so-called "primer film" or a primer coating, obtained by grafting of the primer on the entire surface to which the process is applied. To cover the entire surface, it is necessary to provide a sufficient amount of electrons to form a single layer of adhesion primer. It is recommended that the current applied be on the order of the $mA \cdot cm^{-2}$, the working current density preferably being less than or equal to around $10^{-4}$ $A \cdot cm^{-2}$. An optimal value may be estimated from the mean number of grafting sites on the surface in question. It is preferable for the working potential used not to be more cathodic than $-0.6$ V/SCE. Indeed, to promote the surface reaction, it is advantageous to use a value close to the reduction threshold of the compound that will react at the surface.

The electrolysis of the electrolytic solution can be performed independently by polarization in linear or cyclic voltamperometry (or voltammetry) conditions, in potentiostatic, potentiodynamic, intensiostatic, galvanostatic, or galvanodynamic conditions, or by simple or pulsed chronoamperometry. Advantageously, it is performed by polarization in cyclic voltamperometry conditions. In this case, the number of cycles will preferably be between 1 and 100, and even more preferably between 1 and 10.

Step (a) of the method according to the invention can thus be performed in particular in an electrolytic cell comprising three electrodes: a first working electrode constituting the surface intended to receive the film, a counter electrode and a reference electrode.

The processes leading to the formation of a primer coating by electrografting are known from the prior art and, depending on the type of primer that the user wishes to use, reference can be made in particular to the French patent number 2 871 162 as well as to the aforementioned applications.

The thickness of the primer film can be controlled by the initial concentration of electroactive species, the value of the maximum potential imposed and the polarization time, the latter being capable of varying either directly, that is, the electrolysis time, or by way of a scanning speed in voltamperometry, or by the number of scans in the case of a cyclic voltamperometry.

According to a specific embodiment, it is possible to perform a cleaning of the surface obtained at the end of step (a) before proceeding to step (b). The cleaning is generally performed by washing the surface using a solvent, then by drying it. The washing is preferably performed with the solvent used in step (a), and a washing with the solvent used in step (b) is also envisageable. It is also possible to use a solvent in which the adhesion primer has significant solubility, typically infinite, in order to eliminate any traces of primer that have not reacted at the surface. Advantageously, the washing will be performed under ultrasonic treatment. The drying can be performed with a gas stream; this is why it is recommended to use an inert gas such as a rare gas or nitrogen.

It is possible to preserve the surfaces treated in step (a) for a relatively long period before carrying out step (b). The maximum duration corresponds to the duration necessary for the primer coating to deteriorate. The duration is of course dependent on external conditions; thus in a corrosive atmosphere for the type of adhesion primer used, typically with extreme pH or high temperature conditions, it is recommended to perform step (b) quickly. Generally, the surfaces can be preserved for a number of weeks in ambient conditions.

The protic solvent of step (b) is advantageously chosen from the group consisting of water, acetic acid, hydroxylated solvents such as methanol and ethanol, low-molecular-weight liquid glycols such as ethylene glycol, and mixtures thereof. According to a specific embodiment of the Invention, the protic solvent can be used in a mixture with an aprotic solvent on the understanding that the resulting mixture will have the characteristics of a protic solvent. Water is the preferred solvent; it is particularly beneficial if the water is distilled or deionized.

The "radically polymerizable" monomers correspond to monomers that are able to polymerize following a free-radical mechanism, for example after priming by a primer. Among these monomers, the vinylic monomers are especially involved, in particular the monomers described in the French patent application FR 05 02516 as well as in the French patent application FR-A-2 860 523, issued under the number FR 03 11491. The monomers that are especially concerned are those which, in contrast to compounds that are soluble in any proportion in the solvent considered, are soluble up to a certain proportion in the solvent, i.e. the value of their solubility in this solvent is finite. According to one preferred embodiment of the invention, the "radically polymerizable" monomers are thus chosen among the monomers which solubility in protic solvents is finite.

According to an especially advantageous embodiment of the invention, the vinylic monomer or monomers are chosen among the monomers with the formula (II) below:

(II)

in which the groups $R_1$ to $R_4$, identical or different, represent a non-metallic monovalent atom such as an atom of halogen or an atom of hydrogen or a saturated or unsaturated chemical group such as an alkyl, aryl group, a —$COOR_5$ group in which $R_5$ represents a hydrogen atom or an $C_1$-$C_6$ alkyl group, nitrile, carbonyl, amine or amide.

Among the compounds of formula (II) above, it is possible to mention in particular vinyl acetate, acrylonitrile, methacrylonitrile, methyl methacrylate, ethyl methacrylate, butyl methacrylate, propyl methacrylate, hydroxyethyl methacrylate, hydroxypropyl methacrylate, glycidyl methacrylate; crotononitrile, pentene nitrile, ethyl crotonate and their derivatives; the acrylamides and especially the aminoethyl, propyl, butyl, pentyl and hexyl methacrylamides, the cyanoacrylates, the di-acrylates and di-methacrylates, the tri-acrylates and tri-methacrylates, the tetra-acrylates and tetra-methacrylates (such as pentaerythritol tetramethacrylate), styrene and its derivatives, parachloro-styrene, pentafluoro-styrene, N-vinyl pyrrolidone, 4-vinyl pyridine, 2-vinyl pyridine, the vinyl, acryloyl or methacryloyl halides, divinylbenzene (DVB), and more generally the vinylic cross-linking agents or those based on acrylate or methacrylate groups, and their derivatives.

Among the derivatives of crotononitrile, of pentenenitrile and of ethyl crotonate, it is possible to imagine other compounds such as esters, the corresponding acids or the aminated acids connected by their amine function that are easily accessible by simple chemical reactions known by the person skilled in the art.

The preferred monomers according to the invention are those which solubility in protic solvents is low. Thus, the monomers that can be used according to the process of the invention are preferably chosen among the compounds the solubility of which in the protic solvent is finite and more specifically less than 0.1 M, and most preferably between $10^{-2}$ and $10^{-6}$ M. Among such monomers, it is possible to mention, for example, butylmethacrylate of which the solubility measured under normal temperature and pressure conditions is around $4.10^{-2}$ M in water. According to the invention, and unless otherwise indicated, the normal pressure and temperature conditions (NPTC) correspond to a temperature of 25° C. and a pressure of $1.10^5$ Pa.

The quantity of polymerizable monomer in the solution can vary as a function of the wishes of the experimenter. This quantity may be greater than the solubility of the monomer considered in the protic solvent used and may represent, e.g. 18 to 40 times the solubility of the said monomer at a given temperature, generally room temperature or the reaction temperature. According to an advantageous embodiment, this concentration is between around 0.1 M and 5 M.

It is of course possible to use a mixture of monomers corresponding to those described above. The term monomer is therefore not to be understood in a limited manner when such a possibility presents itself to a person skilled in the art.

Surfactants are molecules containing a lipophilic part (apolar) and a hydrophilic part (polar). Among the surfactants that can be used according to the invention, it is possible to mention:

i) anionic surfactants of which the hydrophilic part is negatively charged; they are preferably chosen from among the compounds of formula (III):

(III)

in which:
  $R_6$ represents an aryl or $C_1$-$C_{20}$ alkyl group, preferably $C_1$-$C_{14}$, and more preferably a $C_1$-$C_{14}$,
  $A^-$ is an anion chosen among the sulfonates, the sulfates, the phosphates, the carboxylates, the sulfosuccinates, etc.

Cat⁺ is a cationic counter-ion, preferably chosen among the ammonium ion ($NH_4^+$), the quaternary ammoniums such as tetrabutylammonium, and the alkaline cations such as $Na^+$, $Li^+$ and $K^+$;

ii) the cationic surfactants which hydrophilic part is positively charged; they are preferably chosen among the quaternary ammoniums with the following formula (IV):

$(R_7)_4-N^+,An^-$ (IV)

in which:
the groups $R_7$, identical or different, represent an aliphatic chain, for example, a $C_1$-$C_{20}$ alkyl chain, preferably $C_1$-$C_{14}$, and more preferably $C_1$-$C_{14}$, or aromatic, $An^-$ is an anionic counter-ion chosen, in particular, among the derivatives of boron such as tetrafluoroborate or the halide ions such as $F^-$, $Br^-$, $I^-$ or $Cl^-$;

iii) the zwitterionic surfactants which are neutral compounds having formal electrical charges with similar value and opposite sign; they are preferably chosen among the following compounds of formula (V):

$Z^--R_8-Z^+$ (V)

in which:
$R_8$ a $C_1$-$C_{20}$ alkyl chain, preferably $C_1$-$C_{14}$, and more preferably $C_5$-$C_{14}$, $Z^-$ represents a negatively charged function held by $R_8$, preferably corresponding to a sulfate or a carboxylate, $Z^+$ represents a positively charged function, preferably an ammonium;

iv) the amphoteric surfactants that are compounds that simultaneously behave like an acid or like a base depending on the medium in which they are placed; these compounds may have an zwitterionic nature, the amino acids are a specific example of this family, v) the neutral surfactants (non-ionic): the surfactant properties, in particular hydrophilicity, are provided by uncharged functional groups such as an alcohol, an ether, an ester or even an amide, containing heteroatoms such as nitrogen or oxygen; because of the low hydrophilic contribution of these functions, the non-ionic surfactant compounds are most usually polyfunctional.

The charged surfactants can of course have several charges.

Among the different meanings of the aryl group of group $R_6$ of the compounds of formula (III) above, it is possible to mention in particular the phenyl cycle, substituted or not, and among the different meanings for the alkyl group $R_6$, the $C_1$-$C_{20}$ alkyl chains, preferably $C_1$-$C_{14}$, and more preferably $C_5$-$C_{14}$.

As a compound of formula (III), tetraethylammonium para-toluene sulfonate, sodium dodecylsulfate, sodium palmitate, sodium stearate, sodium myristate, di(2-ethylhexyl) sodium sulfosuccinate, methylbenzene sulfonate and ethylbenzene sulfonate are preferably used Among the different meanings of the $R_7$ group in quaternary ammoniums of formula (IV) above, it is possible to mention especially the butyl and decadecyl, undecyl, dodecyl and tetradecyl groups. Preferably at least one of the $R_7$ group represents a group comprising at least 5 carbons.

As the compound of formula (IV), ammonium tetradecyl trimethyl bromide (TTAB), alkyl-pyridinium halides having a $C_1$-$C_{18}$ aliphatic chain and the alkylammonium halides are preferably used.

As the zwitterionic surfactant, it is possible to mention especially N,N-dimethyldocecyl ammonium sodium butanoate, dimethyldodecyl ammonium sodium propanoate, and the amino acids.

As the amphoteric surfactant, it is possible to mention especially disodium lauroamphodiacetate, the betaines like alkylaminodipropyl betaine or laurylhydroxy sulfobetaine.

As the non-ionic surfactant, it is possible to mention especially the polyethers like the polyethoxylated surfactants such as e.g. polyethylene glycol lauryl ether (POE23 or Brij® 35), the polyols (surfactants derived from sugars), in particular the glucose alkylates such as e.g., glucose hexanate.

Surfactants that can be used according to the invention are also emulsifiers, i.e., when they are present in small quantities, they facilitate the formation of an emulsion or increase the colloidal stability by decreasing the speed of aggregation or the speed of coalescence or both. Measurements of one or the other of the speeds according to techniques known by a person skilled in the art like the measurement of the size of drops by diffusion of light can make it possible to determine the best emulsifier among the recommended surfactants in each of the cases.

Among the surfactants preferred according to the invention, it is possible to mention the anionic surfactants such as the sulfonates, the quaternary ammoniums and the non-ionic surfactants like the polyoxyethylenes.

The quantity of surfactants in the electrolytic solution is variable, in particular it must be adequate to allow the formation of the copolymer organic film. The minimum quantity of surfactant can easily be determined by sampling the electrolytic solutions of identical composition but with variable surfactant concentration. In a general manner, the surfactant concentration is such that the critical micellar concentration (CMC) will be reached and thus there will be the formation of micelles. The CMC of a surfactant can be determined by the methods known to the person skilled in the art, for example, by measurements of surface tensions.

The concentration of surfactant within the solution is typically at least equal to the CMC and generally between about 0.05 mM and 5 M, and preferably between around 0.1 mM and 150 mM. The recommended concentration of surfactant is usually 10 mM. Typically, the amount of surfactant will be between ¹⁄₂₀ and ¹⁄₁₅₀ that of the monomer and it will preferably be close to ¹⁄₁₀₀; thus a value close to ¹⁄₈₇ is suitable.

The interest in the surfactant is based on its capacity to form micelles in a solvent that promote the growth of macro-radicals by isolating them from the external medium, thus ensuring the growth of the film.

There are numerous free-radical polymerization initiators. This type of reaction is known and studied in detail in the prior art (Rempp & Merrill, Polymer Synthesis, 1991, 65-86, Hüthig & Wepf). In general, the initiator is a chemical species that enables the formation of radicals. Generally, three types of conditions are distinguished, according to the initiator used, for the implementation of the polymerization reaction:

chemical initiation: the most common initiators are peroxides or azo compounds which decomposition into radicals is fastened under reducing conditions (metallic ions for example); usually the reaction condition correspond to normal temperature and pressure conditions, initiator thermal initiation: thermal initiators are generally used specifically in a certain temperature interval, according to their decomposition kinetics, photochemical or radiochemical initiation: the initiators (photoinitiators or radioinitiators) that are excited by the radiation activated by irradiation (usually by UV, but also by γ radiation or by electron beams) enable the production of radicals by more or less complex mechanisms.

In each case a chemical entity is used, the main difference lies in the environmental condition suitable to activate each type of initiator such as to enable it to produce a radical entity.

The different types of initiators, associated with the activation method concerned, can be used. Three types of reaction can be distinguished, each being dependent on the initiator used. To perform the polymerization, it is desirable to use conditions corresponding to the initiator used. Thus, for example, when a photochemical initiator is used, the reaction is carried out by irradiating the solution at the wavelength associated with the appearance of radicals owing to the initiator; in the case of a thermal initiator, it is enough to use a temperature greater than the temperature at which radicals appear from the initiator.

Among the initiators capable of being used in the context of the invention, it is possible in particular to use halogenated initiators such as iodine, the -halogenoalkyls having aryl, allyl, carbonyl or sulfonyl groups, the polyhalogenated compounds such as $CCl_4$ or $CHCl_3$, the compounds having highly labile covalent bonds with halogens and generally corresponding to bonds established between a heteroatom, such as N, S or O, and a halogen, potassium persulfate ($K_2S_2O_8$), azobis(isobutyronitrile), the peroxide compounds such as benzyl peroxide, tert-butyl peroxide, cumyl peroxide, tert-butyl perbenzoate, tert-butyl hydroperoxide, and so on.

The amount of initiator will be chosen according to the process conditions used. Generally, it is between $1/1000$ and $1/20$ monomer equivalents, typically around $1/35$.

According to a specific embodiment, it is possible for the monomer and the initiator to constitute only a single chemical entity. Thus, for example, certain monomers, particularly reactive, when exposed to certain types of radiation, spontaneously form radical species and thus make it possible to carry out the polymerization step (b).

According to a specific embodiment of step (b), the solutions is first placed in contact with the surface obtained in (a) and the initiator is then added and the reaction is carried out.

It is preferable for the reaction to be carried out in the absence of oxygen. To do this, and to remove the oxygen present in the medium, it is recommended to saturate the solution with inert gas such as argon or nitrogen, in particular by passing a stream of said gas into the solution prior to the reaction.

The reaction is typically carried out at room temperature and up to around 100° C. The factor limiting the temperature conditions is essentially the type of solvent that is used. It is of course possible to work with any temperature range in which the solvent remains liquid; the radical polymerization initiator chosen should thus be capable of being used at the chosen temperature.

The solution can also comprise at least one compound, generally organic, which it is desirable to incorporate into the film. It can be a biomolecule, such as a protein, or a molecule having beneficial biological properties such as antithrombotic and anticoagulant compounds. It is preferable in this case for the molecule of interest to be relatively insoluble in the protic solvent and, preferably, to have, in this medium, a solubility similar to that of the monomer and advantageously below it. A mineral compound can also be added to the solution; it can consist in particular of metal ions or metal complexes.

It is of course desirable to carry out the reaction under agitation so that the micelles can easily be formed. For this, it is possible to perform a mechanical stirring operation, in particular using a magnetic bar, by bubbling or with ultrasound.

The thickness of the copolymer organic film formed on the electrically conductive or semi-conductive surface is controlled by simple variation of the experimental parameters that are accessible in an empirical manner to the person skilled in the art according to the polymerizable monomer and the adhesion primer that are used. Thus, in a non-exhaustive manner, the film thickness can be controlled by the number of scans in the case of a cyclic voltamperometry and depending on the concentration of the monomer and the duration of the second step of the process.

The present invention also has as its object electrically conductive or semi-conductive surfaces obtained by implementing the process described above, said surfaces being characterized by the fact that they comprise at least one face that is at least partially covered by a copolymer organic film grafted with at least one "radically polymerizable" monomer and with at least one electrografted primer coating. Such surfaces are likely to be obtained by the process described above.

The copolymer organic films obtained according to the invention advantageously have a thickness between 5 and 1000 nm, inclusive, and even more preferably between 10 and 200 nm, inclusive.

The process according to the invention in particular makes it possible to more easily control the film formation process by comparison with the invention described in the French patent application number 06 01804; indeed, the clear separation into two steps makes it possible to effectively control the quality of the primer coating as well as that of the polymer film formed in step (b).

It should also be noted that the second step is carried out without using electricity, which can represent significant savings. In addition, the polymerization step (b) results in cleaner products because there is no parasitic reaction that might be due to the applied potential.

The encapsulation of entities in step (b) is all the more simple as the reaction conditions are less restrictive, which they were not in the previous invention.

The surfaces obtained according to the invention can be used in any type of industry and in particular in the electronics and microelectronics industries (for example, for the preparation of microelectronic components), for the preparation of biomedical devices such as e.g. devices that are implantable in the organism (for example, stents), screening kits, etc.

The invention also relates to a kit for preparing an organic copolymer film on an electrically conductive or semi-conductive surface. The use of the process makes it possible to prepare and apply a kit for forming an organic copolymer film on an electrically conductive or semi-conductive surface. The preparation of this kit and the use thereof are carried out according to the steps of the process described above.

Such a kit is characterised in that it comprises the following elements:
  an electrically conductive or semi-conductive surface on which an adhesion primer has been electrografted,
  a solution comprising:
    at least one protic solvent,
    at least one "radically polymerizable" monomer, and
    at least one surfactant, and
  a radical polymerization initiator.

It is desirable to preserve the three components in separate packaging. Alternatively, the solution and the conductive surface are preserved in the same packaging, thus reducing the handling necessary for implementing the process, and the initiator is preserved in separate packaging.

It is advantageous for the radical polymerization initiator to be in a solution comprising at least one protic solvent, preferably identical to the solvent used to graft the primer coating. Insofar as the initiator does not have good solubility in the protic solvent, it is recommended that the solution also comprise a surfactant, preferably identical to that of the monomer solution.

According to a specific embodiment, the solution includes organic compounds, which it is desirable to incorporate into the film, as described in the process.

According to another embodiment, the solution is in the form of an emulsion. It is possible in this case for the solution also to contain an emulsion stabilizing agent.

To implement the process according to the invention by using the kit, it is desirable to combine the three components and to have them react together.

BRIEF DESCRIPTION OF THE SEVERAL VIEWS OF THE DRAWINGS

In addition to the previous provisions, the invention also comprises other provisions that result from the description to follow, which refers to the examples of the formation of copolymer organic films on steel surfaces according to the process of the invention as well as to FIGS. 1 to 11 that are attached.

DETAILED DESCRIPTION OF THE INVENTION

It must be understood that all of these examples are given only for illustration of the invention and they do not in any way constitute any limitations whatsoever.

EXAMPLES

The examples presented below were carried out on stainless steel plates 316 of around 6 cm$^2$. These examples, which are consistent with the spirit of the invention, show a procedure in which the operational conditions of the process are optimized.

The process was implemented in order to produce a copolymer film consisting of a polynitrophenylene primer layer, obtained with diazonium salts, on which the various free-radical polymerizable monomers reacted.

Unless otherwise indicated, when it is specified that a plate or a slide is cleaned, it is a cleaning with water followed by an ultrasound treatment in acetone.

Example 1

Step (a) of the Process

The various synthesis parameters were optimised in order to obtain an uniform and solidly grafted layer with a controlled thickness on the metal substrate.

To obtain such a layer, it was decided to carry out the electroreduction of diazonium salts. Previous studies have shown that such grafted layers were obtained for diazonium salt concentrations between 1 and 10 mM. In the following examples, unless otherwise indicated, the initial salt concentration was set at 10 mM.

The synthesis was carried out in an aqueous acidic medium from a commercial salt, 4-nitrobenzene diazonium tetrafluoroborate, ($NO_2C_6H_4N_2{}^+BF_4{}^-$), and benzyl diazonium tetrafluoroborate ($C_6H_5N_2{}^+BF_4{}^-$).

The electrochemical device that was used consisted of a potentiostat and 3 electrodes immersed in an electrochemical cell.

The potentiostat made it possible to precisely control the potential imposed on the working electrode and to choose the method for imposing this potential (chronoamperometry, voltammetry, and so on).

The choice of the metal composing the working electrode was stainless steel (316). It is this electrode that corresponds to the surface on which the copolymer film was formed. This is a technological metal widely used in the industry.

1.1—Commercial Salt

A salt solution at a concentration of 10 mM in water at a pH of 2 was added to the electrochemical cell.

Figure 1:
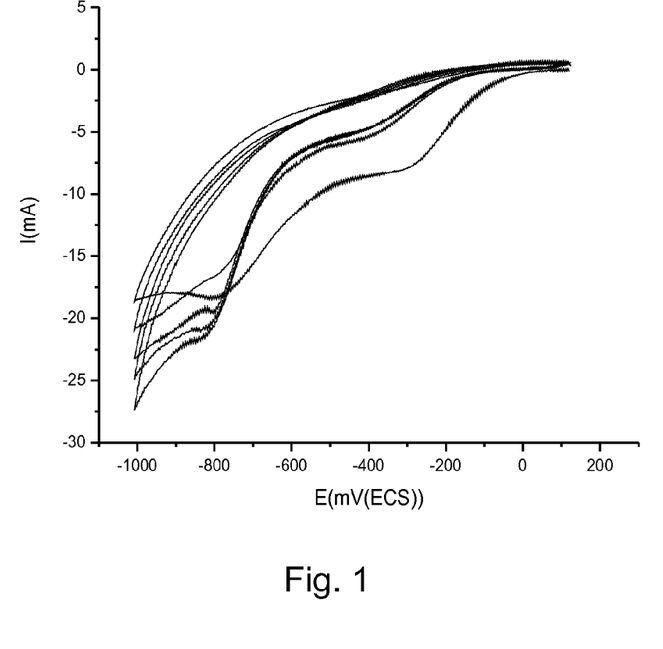
FIG. 1 is a graph illustration showing a voltammogram observed from a solution of 4-nitrobenzene diazonium tetrafluoroborate in acidic water.

The first slides were carried out by cyclic voltammetry at a scanning speed of 20 mV/s, for a switching potential of −1 V and with 5 and 10 cycles. The voltammogram (intensity according to potential) obtained is shown in FIG. 1. In this voltammogram, it can be noted that, during the synthesis, the diazonium salt is reduced first at −0.25 V, then the protons near −0.8 V.

The synthesized polynitrophenylene layer has a copper-gold appearance on the steel plate.

With the naked eye, it appears that the cleaning of the plate causes a portion of this primer layer to disappear.

Various parameters were then modified in order to determine the best conditions for obtaining the most uniform and resistant film possible.

a) Influence of the Number of Cycles

The number of cycles was varied while keeping the other parameters constant. The potential was set at −1 V and the scanning speed at 20 mV/s. The transmittance of one of the absorption bands characteristic of polynitrophenylene obtained after cleaning was measured by an infrared spectrum. The absorption band considered is the absorption band that appears at around 1350 cm$^{-1}$. It corresponds to the symmetric elongation band of the $NO_2$ group. The measurement of the transmittance makes it possible to have an idea of the thickness of the film obtained. This is obtained with an uncertainty on the order of 2%.

In the electrochemical synthesis, it was noted that the films became thicker with the increase in the number of cycles.

Figure 2:
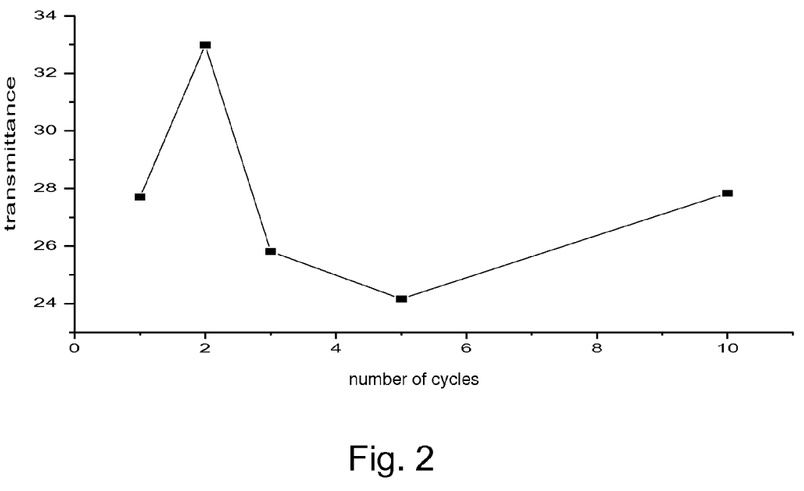
FIG. 2 is a graph illustration showing the influence of the cycle number on the transmittance value of an ultrasound-treated primer coating obtained from a solution of 4-nitrobenzene diazonium tetrafluoroborate in acidic water.

FIG. 2 shows the transmittance percentage at 1350 cm$^{-1}$ according to the number of cycles of a film obtained and treated by ultrasound and acetone. It appears that the smaller the number of cycles is, the more the primer layer resists the ultrasound. It would therefore appear that the thinnest films would be the most resistant. The number of cycles, for the rest of the experiments, was then set to 2.

b) Influence of the Scanning Speed

The scanning speed is an important parameter. Indeed, it is important for the radicals formed to have time to be grafted. If the speed is too high, the radical concentration increases and the size may be increased at the expense of the grafting.

Figure 3:
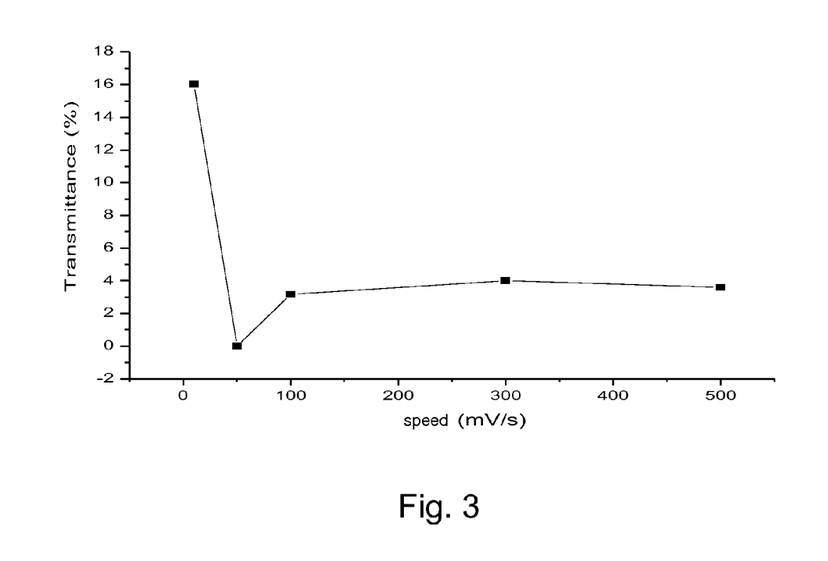
FIG. 3 is a graph illustration showing the influence of the scanning speed on the transmittance value of an ultrasound-treated primer layer obtained from a solution of 4-nitrobenzene diazonium tetrafluoroborate in acidic water.

The results obtained are shown in FIG. 3, which presents the transmittance percentage at 1350 cm$^{-1}$ according to the speed of scanning of a layer obtained after cleaning the potential being set at −1 V. The best result is obtained for a scanning speed of 10 mV/s.

c) Influence of the Switching Potential

The variation in the switching potential influences the amount of current passing through the electrochemical cell, and therefore the quantity of radicals formed in solution. To optimise the potential, its influence was studied in an interval between −0.5 V and −1 V.

Figure 4:
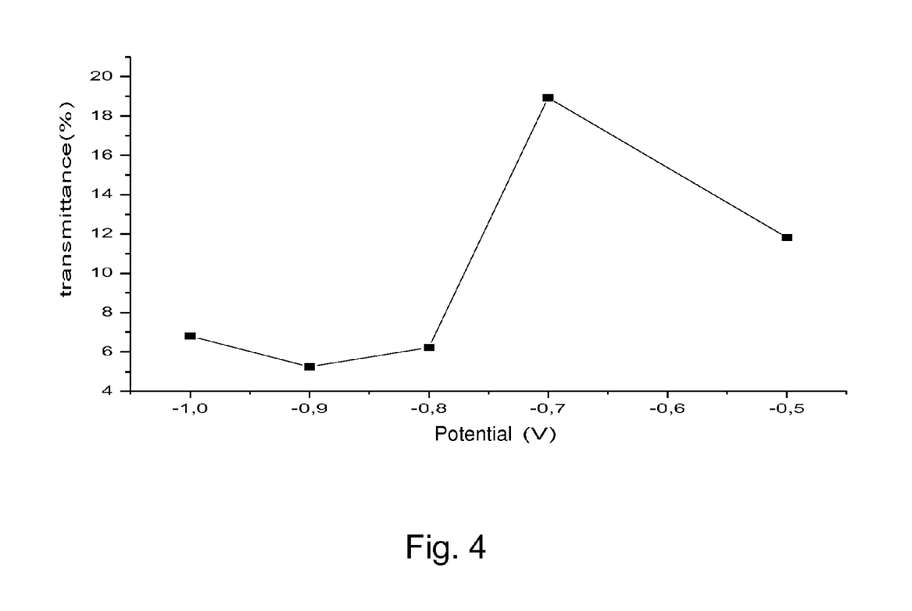
FIG. 4 is a graph illustration showing the influence of the switching potential on the transmittance value of an ultrasound-treated primer coating obtained from a solution of 4-nitrobenzene diazonium tetrafluoroborate in acidic water.

The influence of the potential on the transmittance value (in %) at 1350 cm$^{-1}$ after cleaning is shown in FIG. 4.

It would appear that at around −0.7 V, the film is more uniform and more resistant. However, the choice of potential is relatively difficult, because it is necessary to take into account different parameters. Indeed, since the medium is acidic, which means that there is a large number of protons present therein, it is necessary to take into account the fact that the reduction of the protons occurs at around −0.6 V, and that the evolution of $H_2$, which is then produced, is not favourable for the grafting. Moreover, it is possible that an excessively negative potential will cause the formation of an excessive amount of radicals, and will therefore promote dimerization.

d) Influence of the Concentration

Figure 5:
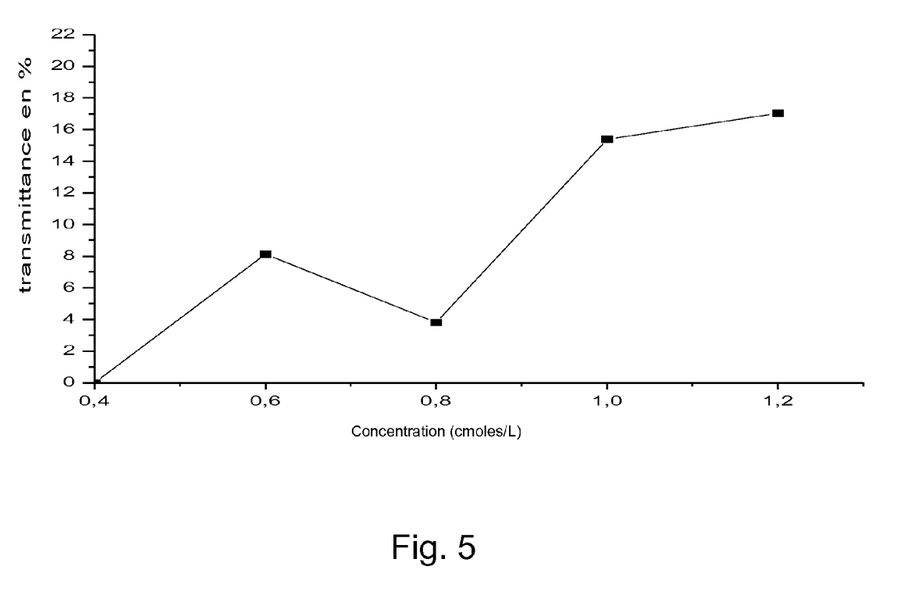
FIG. 5 is a graph illustration showing the influence of the diazonium salt concentration on the transmittance value at 1350 cm$^{-1}$ obtained from a solution of 4-nitrobenzene diazonium tetrafluoroborate in acidic water.

This parameter was one of the first to have been studied; a concentration range of 4 mM to 12 mM was tested. The results obtained are shown in FIG. 5 (the concentration is expressed in centimoles ($10^{-2}$ moles) per liter), for slides after cleaning.

The concentrations for which the results appeared to be the best were 10 mM and 12 mM. However, by setting the concentration at such values and having the other parameters vary, the results obtained were not as good.

Tests with a concentration of 2 mM, a potential of 0.6 V, a number of cycles equal to 2 and a relatively low scanning speed (10 mV/s) were conducted and led to the formation of a uniform layer, having a transmittance at 1350 cm$^{-1}$ on the order of 5% and which is highly resistant to ultrasound and the acetone treatment.

Figure 6:
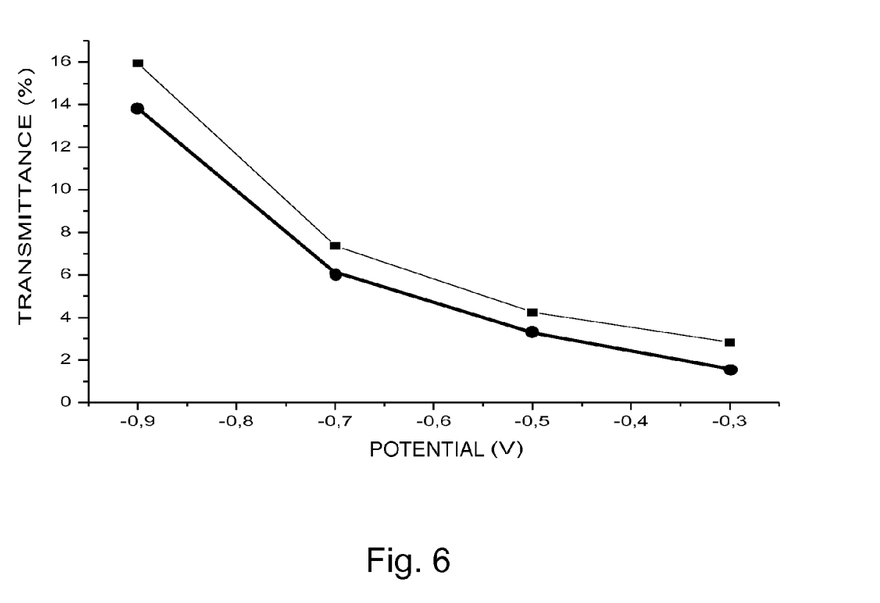
FIG. 6 is a graph illustration showing the influence of the switching potential on the transmittance value at 1350 cm$^{-1}$ for a layer in optimal grafting conditions obtained from a solution of 4-nitrobenzene diazonium tetrafluoroborate in acidic water.

Having obtained the optimal grafting conditions, the impact of the potential on this layer was studied. The results obtained, shown in FIG. 6, show that the potential is also involved at the level of the thickness of the layers obtained. The comparison of the results before (■) and after (●) cleaning, show that a practically identical percentage of polynitrophenylene is lost, regardless of the apparent thickness of the layer.

1.2—Other Salt

Benzyl diazonium tetrafluoroborate was prepared with a yield of 25% by reacting aniline (10 mmoles) on sodium nitrite (11 mmoles) in the presence of tetrafluoroboric acid at −10° C. A salt solution at a concentration of 10 mM in water at a pH of 2 was added to the electrochemical cell.

a) Influence of the Number of Cycles

A study was performed on the influence of the number of cycles. The results obtained differ from those obtained in the case of 4-nitrobenzenediazonium salt. The first slides were carried out with a potential of −1 V, a scanning speed of 20 mV/s and a number of cycles varying from 1 to 10. The films obtained have a light yellow appearance, which diffuses light.

Figure 7:
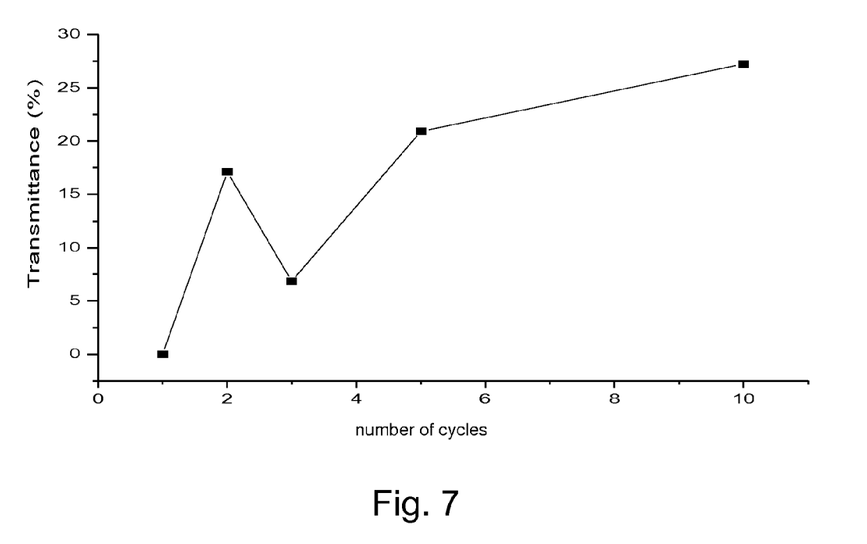
FIG. 7 is a graph illustration showing the influence of the cycle number on the transmittance value of an ultrasound-treated primer coating obtained from a solution of benzyl diazonium tetrafluoroborate in acidic water.

The value of the transmittance is shown in FIG. 7 at the end of this treatment (results obtained in consideration of the absorption band at around 700 cm$^{-1}$ on the infrared spectrum).

In the case of 4-nitrobenzenediazonium salt, experiments have shown that the thinnest films were the most resistant. However, in this case, it is the thickest films that appear to be the most resistant. The parameter of the number of cycles was then set at 5.

b) Influence of the Switching Potential

Figure 8:
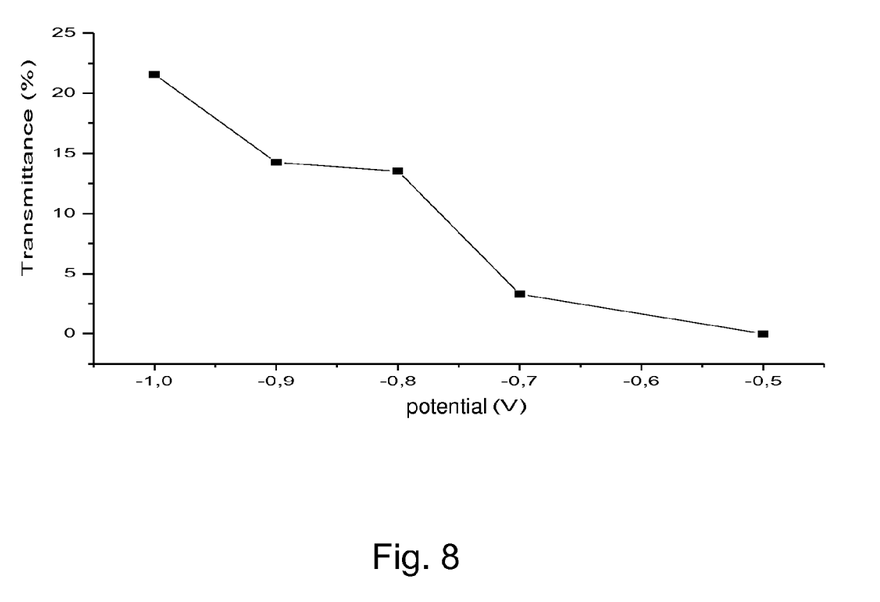
FIG. 8 is a graph illustration showing the influence of the switching potential on the transmittance value of an ultrasound-treated primer layer obtained from a solution of benzyl diazonium tetrafluoroborate in acidic water.

The influence of the switching potential was studied from −0.5 V to −1 V and the layers were produced at a scanning speed of 20 mV/s for 5 cycles. It appears from the variation in transmittance according to the switching potential, shown in FIG. 8, that the most negative potentials yield the thickest and most resistant films.

1.3—Conclusion

At the end of this study, it appears that the concentration and value of the potential have a major impact on the grafting conditions of diazonium salts and that, in addition, the other parameters (number of cycles and scanning speed) influence the thickness of the films obtained. The values proposed thus correspond to optimised conditions for the primers considered.

Example 2

Step (b) of the Process

Three monomers were selected to illustrate the second step of the process: butyl methacrylate (BUMA), styrene and vinyl acetate.

As a protic solvent, it was decided to use water; in this case, it is deionized water. The monomers used have low water solubility.

As a surfactant, it was decided to use sodium dodecylsulfate (SDS) (8 mM).

The radical polymerization initiator (2 mM) used is potassium persulfate ($K_2S_2O_8$). This makes it possible to form radicals at a temperature below 100° C.

The solutions were prepared by adding all of the compounds to the solvent (32 mL). The concentration of monomers was 0.7 M. Then, in a ground glass tube, a magnetic stirrer and a Teflon support were introduced in order to prevent any contact between the magnetic stirrer and the stainless steel slide coated with polynitrophenylene. The plates synthesized in example 1 were then added.

The above is stirred, using a magnetic bar, and heated to 70° C. for two hours. For the duration of the experiment, argon bubbling in the reaction medium is established in order to remove any dioxygen that may be there. Indeed, dioxygen is an inhibitor of radical polymerization (it causes the termination of growing chains).

2.1—BUMA

Figure 9A:
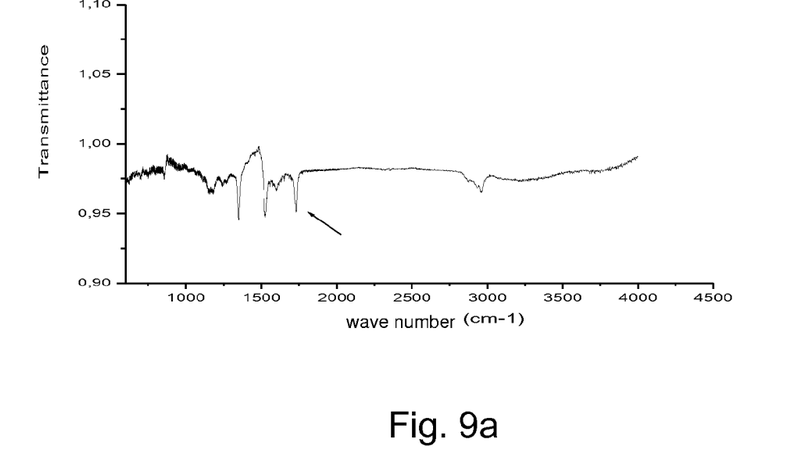
FIG. 9 is a graph illustration showing the infrared spectrum of a polynitrophenylene film with: polyBUMA (a), polystyrene (b) and vinyl polyacetate (c).

After cleaning of the plate, the results obtained are relatively satisfactory, as shown by the infrared spectrum shown in FIG. 9a. The absorption band at 1730 cm$^{-1}$ is characteristic of polyBUMA (more specifically the carbonyl group). The transmittance obtained is on the order of 4%. The grafted polyBUMA gives the plate a bluish appearance.

It therefore appears that the grafting of polyBUMA on the primer layer was successfully carried out.

2.2—Styrene

Figure 9B:
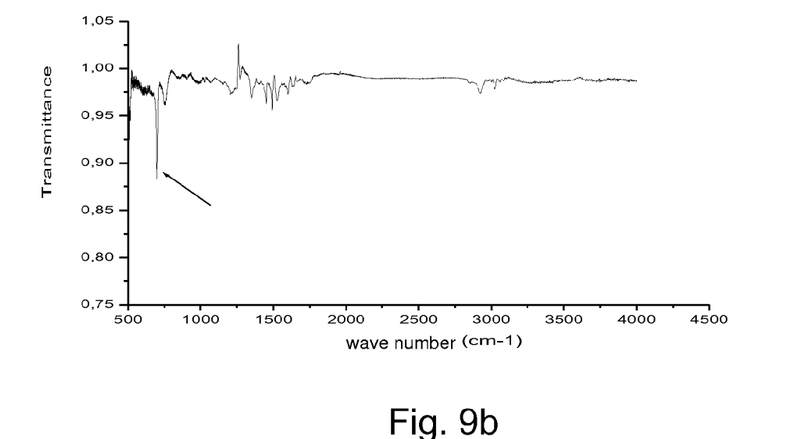

After cleaning, the plates obtained have a milky white film. The infrared spectrum of a plate after cleaning (acetone and ultrasound) is shown in FIG. 9b. The band characteristic of the styrene considered is the band at around 700 cm$^{-1}$ (out-of-plane deformation of aromatic C—H), because it is the most intense absorption band of the spectrum. The transmittance value obtained is 11%.

It therefore appears that the grafting of polystyrene on the primer layer was successfully carried out.

2.3—Vinyl Acetate

Figure 9C:
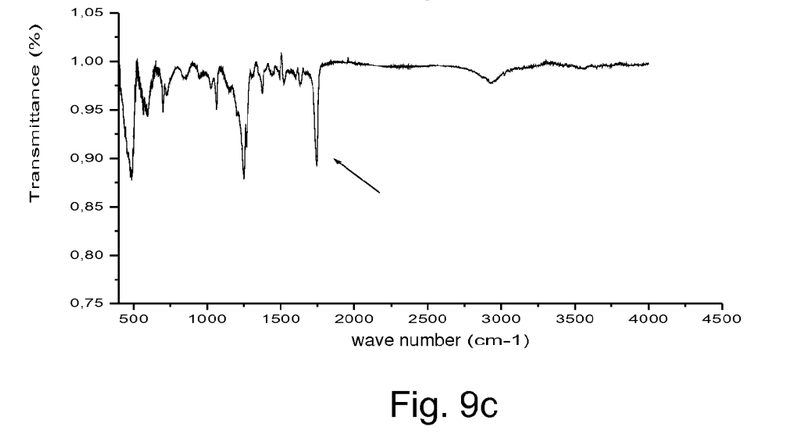

The infrared spectrum of a plate obtained after cleaning is shown in FIG. 9c. The band characteristic of the vinyl acetate considered is the most intense band at 1750 cm$^{-1}$; it corresponds to the elongation band of the ester carbonyl CO group. The transmittance value obtained is 10.7%.

It therefore appears that the grafting of vinyl polyacetate on the primer layer was successfully carried out.

2.4—Study of the Influence of the Primer Layer Synthesis Potential

To demonstrate the influence of the thickness of the primer layer on the copolymer film, primer layers having different thicknesses were produced by varying the potential.

The transmittance values, determined from the characteristic band of NO$_2$ at 1350 cm$^{-1}$, of two types of plates, having undergone two voltammetric cycles, are shown in table I:

| Samples | Concentration (mM) | Scanning speed (mV/s) | Potential (V) | Transmittance obtained (%) |
|---|---|---|---|---|
| Nitropo1 | 2 | 10 | −0.3 | 1.5 |
| Nitropo4 | 2 | 10 | −0.9 | 13.8 |

BUMA was used as a monomer. In both cases, a grafting of the polyBUMA is observed. To estimate the thickness thereof, an infrared analysis was performed after having allowed the plates to soak for several hours in DMF (dimethylformamide) and having treated them by ultrasound.

Figure 10:
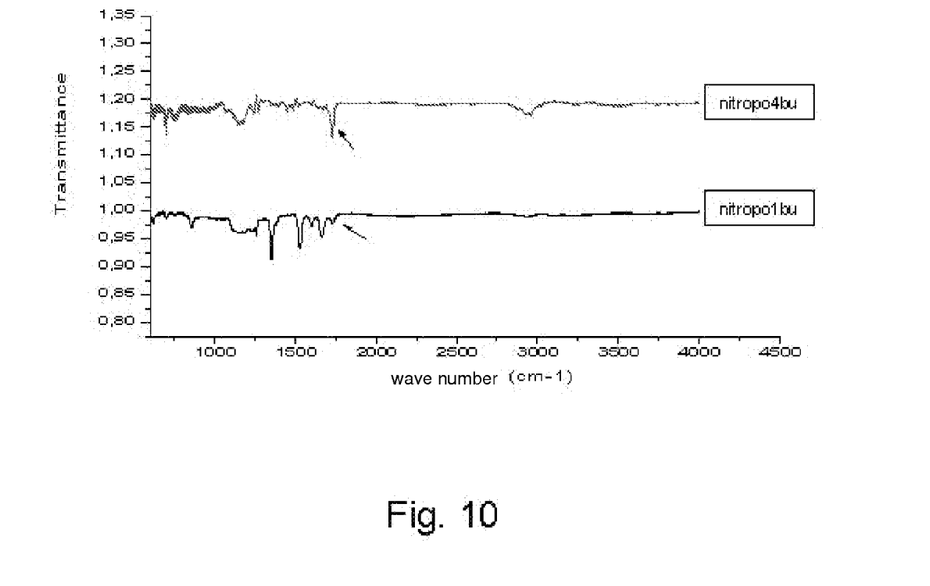
FIG. 10 is a graph illustration showing the infrared spectra of two films of polynitrophenylene and polyBUMA showing the influence of the thickness of the primer sub-layer on the grafting conditions.

The infrared spectra of a polynitrophenylene film and a polyBUMA film showing the influence of the thickness of the primer coating on the grafting conditions are shown in FIG. 10. The absorption band characteristic of polyBUMA is at 1730 cm$^{-1}$ (indicated by the two arrows).

The upper spectrum shows the sample (polydiazonium+ BUMA) that has the thinner primer layer and the lower spectrum shows the sample that has the thickest primer layer.

On the upper spectrum, the characteristic absorption band has a transmittance of 6%, while on the lower spectrum, it is 3%. It would appear in these conditions that the thinner the primer layer is, the thicker the second grafted film is.

2.5—Influence of the Monomer Concentration

To study the influence of the monomer concentration, five solutions with different BUMA concentrations (0.5 M for no210bu, 1 M for no211bu, 1.4 M for no212bu and 2 M for no213bu) were prepared. For each of them, the ratio of monomer concentration to surfactant concentration was set at 87.5, and the amount of primer remained constant (2 mM).

Figure 11:
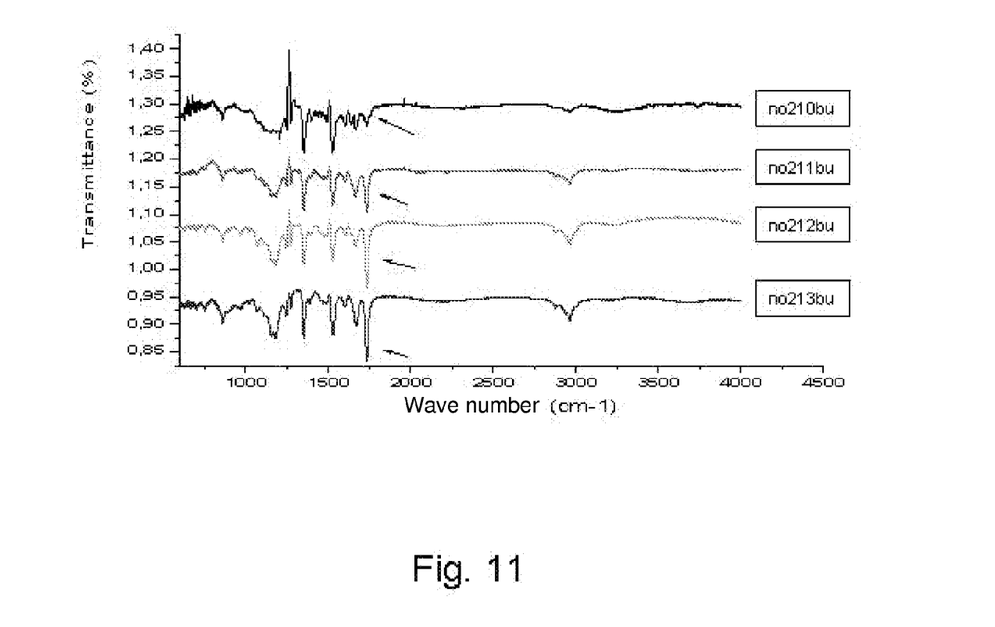
FIG. 11 is a graph illustration showing the infrared spectra of five copolymer films of polyBUMA produced at various monomer concentration.

The infrared spectra obtained after a cleaning with DMF of the plates is shown in FIG. 11 for each of the solutions. The absorption band of carbonyl at 1730 cm$^{-1}$, characteristic of polyBUMA was used to calculate the transmittances. The results are shown in table II:

|  | Samples | | | |
|---|---|---|---|---|
|  | no210bu | no211bu | no212bu | no213bu |
| Concentration (mol/l) | 0.5 | 1 | 1.4 | 2 |
| Transmittance (%) | 4 | 8 | 12.1 | 12.1 |

In view of this table, it would appear that the thickness of the film increases with the concentration until a maximum thickness is reached.

Example 3

Kit for Preparing an Organic Copolymer Film

Such a kit was produced from the plates obtained in example 1. The plates were packaged in glass or plastic containers with Teflon, containing deionised aqueous solutions and saturated with argon containing BUMA and SDS in the proportions indicated in example 2.

The containers were preserved for 1 to 14 days. At the end of the period in the aqueous, deionised and argon-saturated solution, initiator was added under agitation at around 70° C. to the solutions in the containers.

The results are identical to those obtained in example 2.

I claim:

1. A method for forming an organic copolymer film on an electrically conductive or semi-conductive cathodic surface, said method comprising the steps (a) and (b) of:
   (a) performing electrolysis of an electrolytic solution containing an adhesion primer selected from halogenoalkanes and compounds of formula I $$R-N_2^+, A^- \qquad (I)$$

in which:
   A$^-$ is a monovalent anion; and
   R represents an aryl group;
   until a primer coating is formed on the cathodic surface, the electrolysis being performed at a reduction potential at least equal to the reduction potential of the adhesion primer; and
   (b) reacting in the presence of a free radical polymerization initiator, in which no electrolysis occurs, a solution comprising:
   (i) at least one protic solvent,
   (ii) at least one radically polymerizable monomer having a solubility in said at least one protic solvent of less than 0.1M at 25° C. and 1×10$^5$ Pa, and
   (iii) at least one surfactant,
   said solution being placed on the surface obtained after performing electrolysis step (a).

2. The method of claim 1, wherein the electrically conductive or semi-conductive cathodic surface is selected from a group consisting of: stainless steel, steel, iron, copper, nickel, cobalt, niobium, aluminium, silver, titanium, silicon with or without its oxide, titanium nitride, tungsten, tungsten nitride, tantalum, tantalum nitride and noble metal surfaces of at least one metal chosen among gold, platinum, iridium and platinum-iridium alloy.

3. The method of claim 1, wherein the step (a) of performing electrolysis of the electrolytic solution further comprises a solvent selected from a group consisting of dimethylformamide, ethyl acetate, acetonitrile, dimethyl sulfoxide, tetrahydrofuran, the protic solvents, and a mixture of two or more of solvents.

4. The method of claim 1, wherein the step (a) of performing electrolysis of the electrolytic solution further comprises a protic solvent selected from a group consisting of water, acetic acid, hydroxylated solvents, liquid glycols with low molecular weight and mixtures thereof.

5. The method of claim 1, wherein $A^-$ is selected from a group consisting of halides, carboxylates, halogenoborates, and perchlorates.

6. The method of claim 1, wherein the adhesion primer is selected from a group consisting of phenyl diazonium tetrafluoroborate, 4-nitrophenyl diazonium tetrafluoroborate, 4-bromophenyl diazonium tetrafluoroborate, 2-methyl-4-chlorophenyl diazonium tetrafluoroborate, 4-benzoylbenzene diazonium tetrafluoroborate, 4-cyanophenyl diazonium tetrafluoroborate, 4-carboxyphenyl diazonium tetrafluoroborate, 4-acetamidophenyl diazonium tetrafluoroborate, 4-phenylacetic acid diazonium tetrafluoroborate, 2-methyl-4-[(2-methylphenyl)diazenyl]benzene diazonium sulphate, 9,10-dioxo-9,10-dihydro-1-anthracene diazonium chloride, 4-nitronaphthalene diazonium tetrafluoroborate and naphtalene diazonium tetrafluoroborate.

7. The method of claim 1, wherein the adhesion primer has a concentration within the electrolytic solution between $10^{-4}$ and 0.5M.

8. The method of claim 1, further comprising:
cleaning of the surface obtained after the step (a) of performing electrolysis.

9. The method of claim 1, wherein the protic solvent is chosen from a group consisting of: water, acetic acid, hydroxylated solvents, low-molecular-weight liquid glycols and mixtures thereof.

10. The method of claim 1, wherein the protic solvent is mixed with an aprotic solvent, having characteristics of a protic solvent.

11. The method of claim 1, wherein the radically polymerizable monomer is a vinylic monomer.

12. The method of claim 1, wherein the radically polymerizable monomer is chosen among a group of monomers with the following formula (II):

(II)

wherein groups $R_1$ to $R_4$, identical or different, represent a non-metallic monovalent atom, alkyl, aryl, —$COOR_5$ wherein $R_5$ is hydrogen, $C_1$-$C_6$ alkyl, nitrile, carbonyl, amine or amide.

13. The method of claim 1, wherein the radically polymerizable monomer is selected from a group consisting of vinyl acetate, acrylonitrile, methacrylonitrile, methyl methacrylate, ethyl methacrylate, butyl methacrylate, propyl methacrylate, hydroxyethyl methacrylate, hydroxypropyl methacrylate, glycidyl methacrylate; crotononitrile, pentene nitrile, ethyl crotonate; the acrylamides cyanoacrylates, di-acrylates and di-methacrylates, tri-acrylates and tri-methacrylates, tetra-acrylates and tetra-methacrylates, styrene, parachloro-styrene, pentafluoro-styrene, N-vinyl-pyrrolidinone, 4-vinyl pyridine, 2-vinyl pyridine, the vinyl, acryloyl or methacryloyl halides, divinylbenzene (DVB), vinylic cross-linking agents, vinylic cross-linking agents based on acrylate or methacrylate groups.

14. The method of claim 1, wherein a quantity of radically polymerizable monomer in the solution is 18 to 40 times the maximum solubility of the radically polymerizable monomer in the protic solvent at a given temperature.

15. The method of claim 1, wherein a concentration of the radically polymerizable monomer is between 0.1 M and 5 M.

16. The method of claim 1, wherein the surfactant is an anionic surfactant of the following formula (III):

$$R_6\text{-}A^-, Cat^+, \qquad (III)$$

wherein:
$R_6$ is selected from a group consisting of aryl and a $C_1$-$C_{20}$ alkyl group, and $A^-$ is an anion chosen from a group consisting of sulfonates, sulfates, phosphates, carboxylates, and sulfosuccinates; and $Cat^+$ is a cationic counter-ion selected from a group consisting of ammonium ($NH_4^+$), quaternary ammonium and alkaline cations.

17. The method of claim 1, wherein the surfactant of formula III is selected from a group consisting of tetraethylammonium paratoluene sulfonate, sodium dodecylsulfate, sodium palmitate, sodium stearate, sodium myristate, di(2-ethylhexyl) sodium sulfosuccinate, sodium methylbenzene sulfonate and sodium ethylbenzene sulfonate.

18. The method of claim 1, wherein the surfactant has a quantity between 1/150 and 1/20 of a quantity of the radically polymerizable monomer.

19. The method of claim 1, wherein the free radical polymerization initiator is selected from a group consisting of halogenated initiators, α-halogenoalkyls having aryl, allyl, carbonyl or sulfonyl groups, polyhalogenated compounds, in which the compounds have labile covalent bonds with halogens, potassium persulfate ($K_2S_2O_8$), azobis(isobutyronitrile), and peroxide compounds, tert-butyl perbenzoate, or tert-butyl hydroperoxide.

20. The method of claim 1, wherein the free radical polymerization initiator has a quantity between 1/1000 and 1/20 monomer equivalent.

21. The method of claim 1, wherein the reacted solution of step (b) further comprises an organic or mineral compound incorporated into a film.

22. The method of claim 1, wherein the step (a) of performing electrolysis of the electrolytic solution further comprises methanol or ethanol.

23. The method of claim 1, wherein the step (a) of performing electrolysis of the electrolytic solution further comprises ethylene glycol.

24. The method of claim 1, wherein the protic solvent is methanol or ethanol.

25. The method of claim 1, wherein the radically polymerizable monomer is a vinylic monomer chosen among a group of monomers with the following formula (II):

(II)

wherein groups $R_1$ to $R_4$, identical or different, are halogen or hydrogen.

26. The method of claim 1, wherein the radically polymerizable monomer is selected from a group consisting of aminoethyl, propyl, butyl, pentyl and hexyl methacrylamides.

27. The method of claim 1, wherein the radically polymerizable monomer is pentaerythritol tetramethacrylate.

28. The method of claim 1, wherein the surfactant is an anionic surfactant of the following formula (III):

(III)

wherein:
 $R_6$ is selected from a group consisting of aryl or $C_1$-$C_{14}$ alkyl group; and
 $A^-$ is an anion chosen from a group consisting of sulfonates, sulfates, phosphates, carboxylates, and sulfosuccinates; and
 $Cat^+$ is a cationic counter-ion selected from a group consisting of ammonium ($NH_4^+$), quaternary ammonium and alkaline cations.

29. The method of claim 1, wherein the surfactant is an anionic surfactant of the following formula (III):

(III)

wherein:
 $R_6$ is selected from a group consisting of aryl or $C_5$-$C_{14}$ alkyl group; and
 $A^-$ is an anion chosen from a group consisting of sulfonates, sulfates, phosphates, carboxylates, and sulfosuccinates; and
 $Cat^+$ is a cationic counter-ion selected from a group consisting of ammonium ($NH_4^+$), quaternary ammonium and alkaline cations.

30. The method of claim 1, wherein the surfactant is an anionic surfactant of the following formula (III):

(III)

wherein:
 $R_6$ is selected from a group consisting of aryl or $C_1$-$C_{14}$ alkyl group; and
 $A^-$ is an anion chosen from a group consisting of sulfonates, sulfates, phosphates, carboxylates, and sulfosuccinates; and
 $Cat^+$ is tetrabutylammonium.

31. The method of claim 1, wherein the free radical polymerization initiator is selected from a group consisting of: $CCl_4$, $CHCl_3$, benzyl peroxide, tert-butyl peroxide, cumyl peroxide.

* * * * *